(12) United States Patent
Buteyn

(10) Patent No.: US 11,277,953 B1
(45) Date of Patent: Mar. 22, 2022

(54) ROLLING HARROW

(71) Applicant: Scott Allen Buteyn, Campbellsport, WI (US)

(72) Inventor: Scott Allen Buteyn, Campbellsport, WI (US)

( * ) Notice: Subject to any disclaimer, the term of this patent is extended or adjusted under 35 U.S.C. 154(b) by 445 days.

(21) Appl. No.: 16/389,599

(22) Filed: Apr. 19, 2019

Related U.S. Application Data

(60) Provisional application No. 62/660,856, filed on Apr. 20, 2018.

(51) Int. Cl.
*A01B 23/02* (2006.01)
*A01B 21/04* (2006.01)

(52) U.S. Cl.
CPC .............. *A01B 23/02* (2013.01); *A01B 21/04* (2013.01)

(58) Field of Classification Search
CPC ................................ A01B 23/02; A01B 21/04
See application file for complete search history.

(56) References Cited

U.S. PATENT DOCUMENTS

| | | | |
|---|---|---|---|
| 855,247 A * | 5/1907 | Hurt | A01B 21/04 172/548 |
| 943,989 A | 12/1909 | Nacke | |
| 2,559,048 A | 7/1951 | Seaman | |
| 3,150,721 A | 9/1964 | Van Der Lely | |
| 3,702,638 A | 11/1972 | Takata | |
| 4,629,007 A | 12/1986 | Pegoraro | |
| 5,158,145 A * | 10/1992 | Karchewski | A01B 21/04 172/456 |
| 5,355,963 A | 10/1994 | Boyko et al. | |
| 5,662,173 A | 9/1997 | Blessing | |
| 2015/0075825 A1 | 3/2015 | Duffy | |

OTHER PUBLICATIONS

Turftime Equipment, website printout from http://www.turftimeeq.com/parts/advantage-aerators-replacement-tines as viewed on Mar. 6, 2018 (3 pages).

* cited by examiner

*Primary Examiner* — Tara Mayo-Pinnock
(74) *Attorney, Agent, or Firm* — Brannen Law Office, LLC

(57) ABSTRACT

The present invention relates to a rolling harrow, and in particular to a rolling harrow with replaceable attachments. The harrow has a shaft upon which several spindles are supported. Central spindles have two flanges, one of which is on either end of the spindle. Each flange preferably has sixteen holes equally spaced about the perimeter. A lip protruded beyond each flange. Two end spindles are provided, one on each end of the shaft. The end spindles have one flange with sixteen equally spaced perimeter holes and an end spindle lip that protrude beyond the flange. Junctions are formed where two lips abut each other. At each junction, attachments are removably connected to two spaced flanges. The attachments connect to two of the perimeter holes. Attachments, between successive junctions, can be rotationally offset.

18 Claims, 19 Drawing Sheets

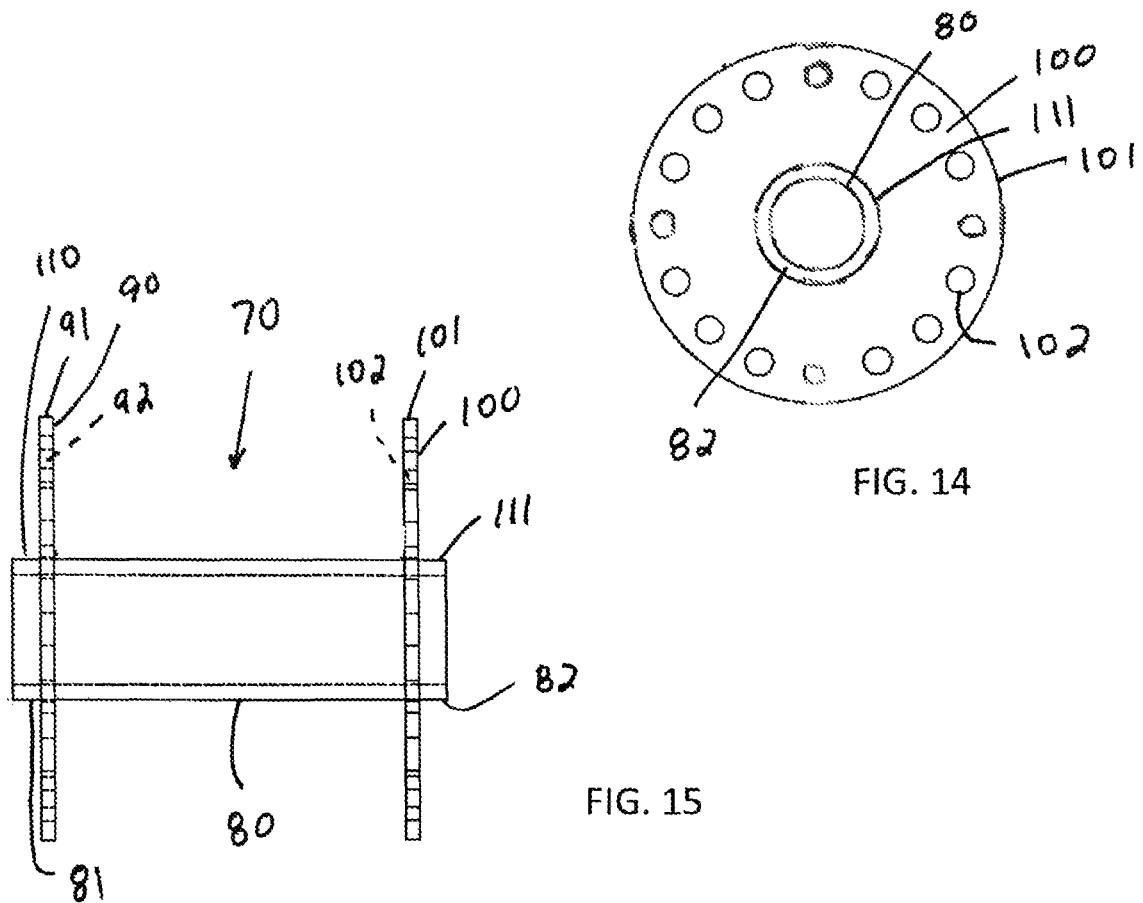
FIG. 14
FIG. 15
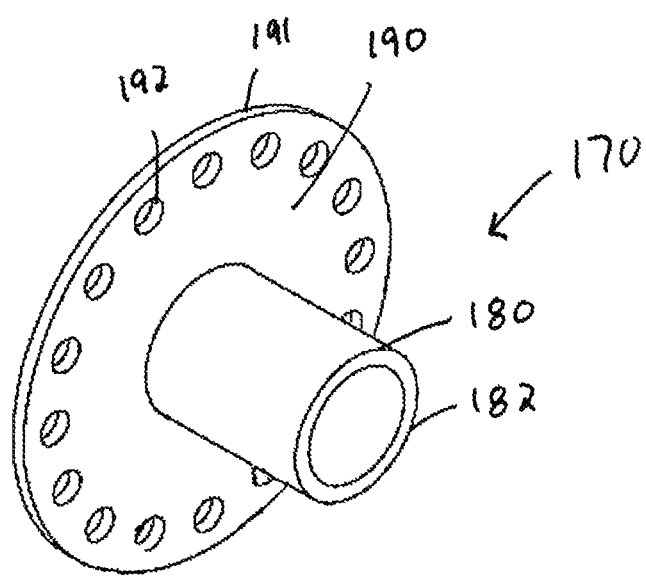
FIG. 16

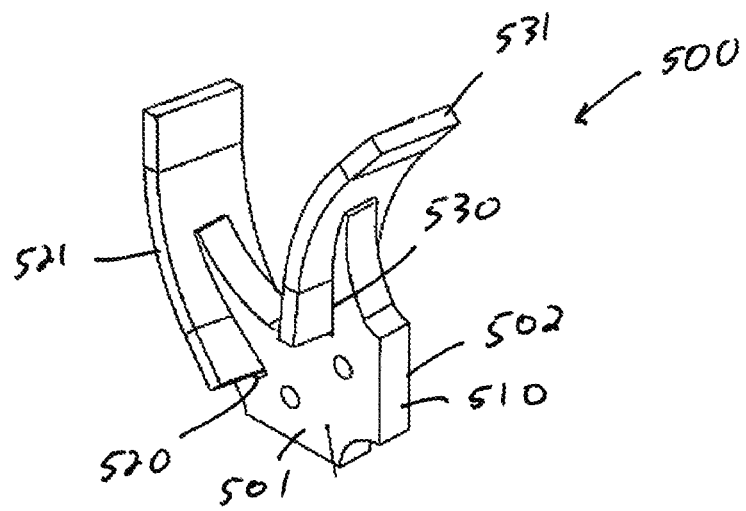
FIG. 21
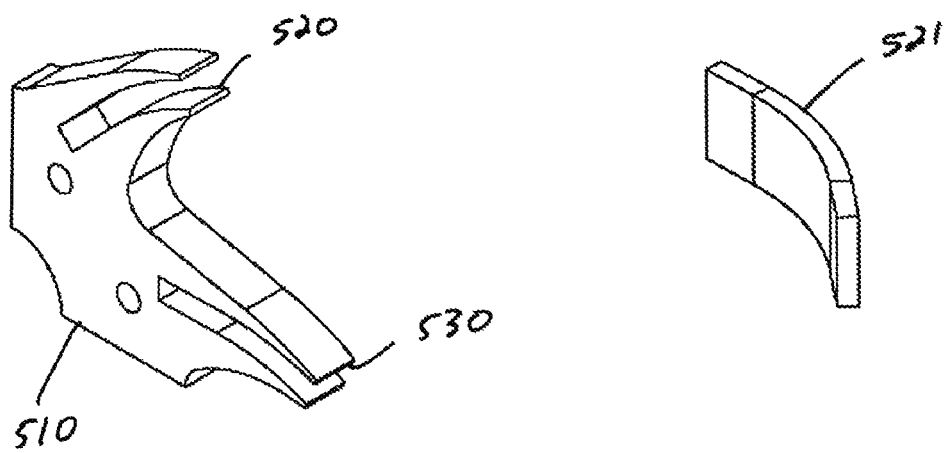
FIG. 22
FIG. 23

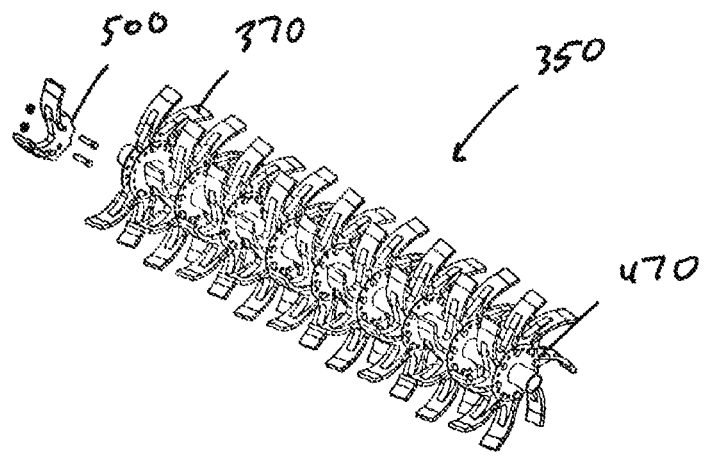
FIG. 24
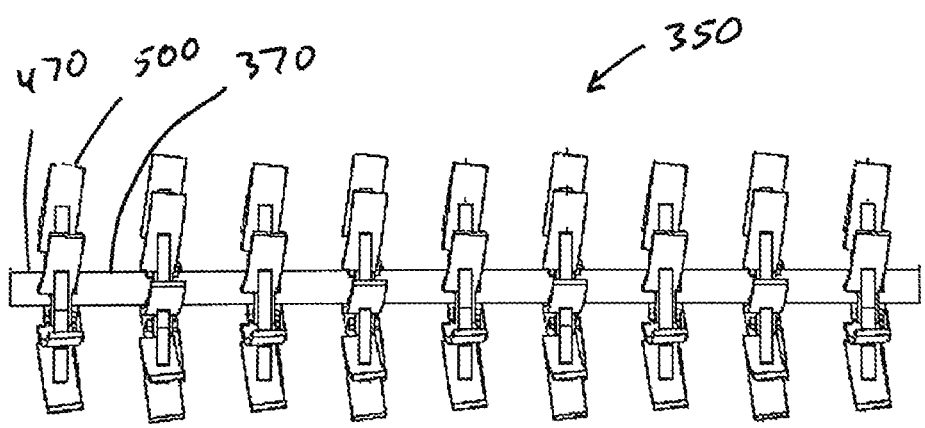
FIG. 25
FIG. 26
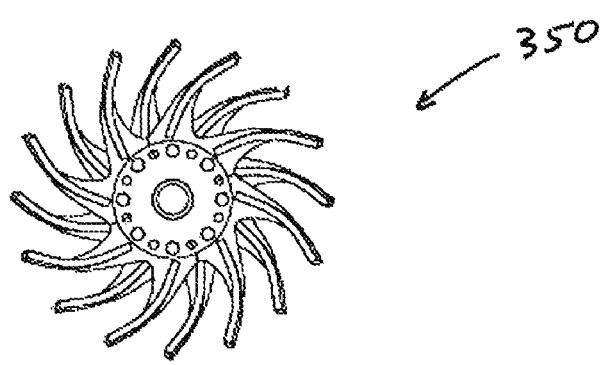

ROLLING HARROW

This United States utility patent application claims priority on and the benefit of provisional application 62/660,856 filed Apr. 20, 2018, the entire contents of which being hereby incorporated herein by reference.

BACKGROUND OF THE INVENTION

1. Field of the Invention

The present invention relates to a rolling harrow, and in particular to a rolling harrow with replaceable attachments.

2. Description of the Related Art

Rolling harrows are implements useful for breaking up and smoothing soil. Many harrows are known. Yet, none of the existing rolling harrows have attachments that are easily interchangeable or replaceable.

Thus, there exists a need for a rolling harrow that solves this and other problems.

SUMMARY OF THE INVENTION

The present invention relates to a rolling harrow, and in particular to a rolling harrow with replaceable attachments. The harrow has a shaft upon which several spindles are supported. Central spindles have two flanges, one of which is on either end of the spindle. Each flange preferably has sixteen holes equally spaced about the perimeter. A lip protrudes beyond each flange. Two end spindles are provided, one on each end of the shaft. The end spindles have one flange with sixteen equally spaced perimeter holes and an end spindle lip that protrude beyond the flange. Junctions are formed where two lips abut each other. At each junction, attachments are removably connected to two spaced flanges. The attachments connect to two of the perimeter holes. Attachments, between successive junctions, can be rotationally offset.

According to one advantage of the present invention, bolts can connect the attachments to respective flanges of two adjacent spindles at each junction. In this regard, the rotational orientation of the two adjacent spindles is locked providing rotational stability to the harrow. The harrow is rigid on account of all of the bolts used to support the attachments and connect the spindles. In one embodiment, bolt holders and nut guards are provided for ease of fastening nuts to bolts.

According to a further advantage of the present invention, each attachment has a neck that abuts the round face of the junction to reduce or eliminate sheer stress on the bolts connecting the attachments to the junction.

According to a still further advantage of the present invention, each attachment can have two walls that are perpendicular to each other. In this regard, when four attachments are supported at a junction, each face abuts a face of an adjacent attachment. This reduces or eliminates bolt stress that otherwise could develop during use of the harrow as the bolt stresses are mitigated by the abutting facial engagements.

According to another advantage of the present invention each attachment can have two holes that are used to connect the attachment to the junction. The use of two holes prevents rotation of the attachment relative to the junction.

According to another advantage of the present invention, the attachments can have two spikes each. This increases the number of contacts with the ground or surface.

According to another advantage of the present invention, the attachments can be cut instead of bent for increased strength.

According to another advantage of the present invention, each flange can have sixteen equally spaced holes about the respective perimeter. This advantageously allows the attachments to be rotationally offset between successive junctions. Rotational offset advantageously allows for greater spacing of spikes and more points of contact with the surface. Increasing the spacing of the points of contact results in smoother operation of the harrow.

According to still further advantage of the present invention, lips are provided that space the flanges of adjacent spindles a selected amount. The junction gap is preferably always the same and allow for easy insertion and removal of attachments. In this regard, the bolts, not friction, hold the attachments in place.

Related, the attachments of the present invention are independently replaceable in the field without the need to disassembly the entire harrow or even to disconnect it from the harness or machine.

It is appreciated that left, right, angled or otherwise shaped attachments can be used with the present invention. In this regard, the specific attachments can be changed without the need to remove the spindles from the shaft. This allows for increased flexibility of use of the present invention for different specific applications.

It is also appreciated that in an alternative embodiment, that semicircular attachments can be used, and in an embodiment where four are used, rotational stability can be obtained within the attachment itself.

Other advantages, benefits, and features of the present invention will become apparent to those skilled in the art upon reading the detailed description of the invention and studying the drawings.

BRIEF DESCRIPTION OF THE DRAWINGS

FIG. 14 is an end view of the spindle illustrated in FIG. 13.

FIG. 15 is a side view of the spindle illustrated in FIG. 13.

FIG. 16 is a perspective view of an end spindle.

FIG. 21 is a perspective view of an alternative embodiment of an attachment.

FIG. 22 is a perspective view of a base of the attachment illustrated in FIG. 21.

FIG. 23 is a perspective view of an inset of the attachment illustrated in FIG. 21.

FIG. 24 is a partially exploded perspective view showing a harrow with attachments shown in FIG. 21.

FIG. 25 is a side view of the embodiment illustrated in FIG. 24.

FIG. 26 is an end view of the embodiment illustrated in FIG. 24.

DETAILED DESCRIPTION OF PREFERRED EMBODIMENTS

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

Figure 1:
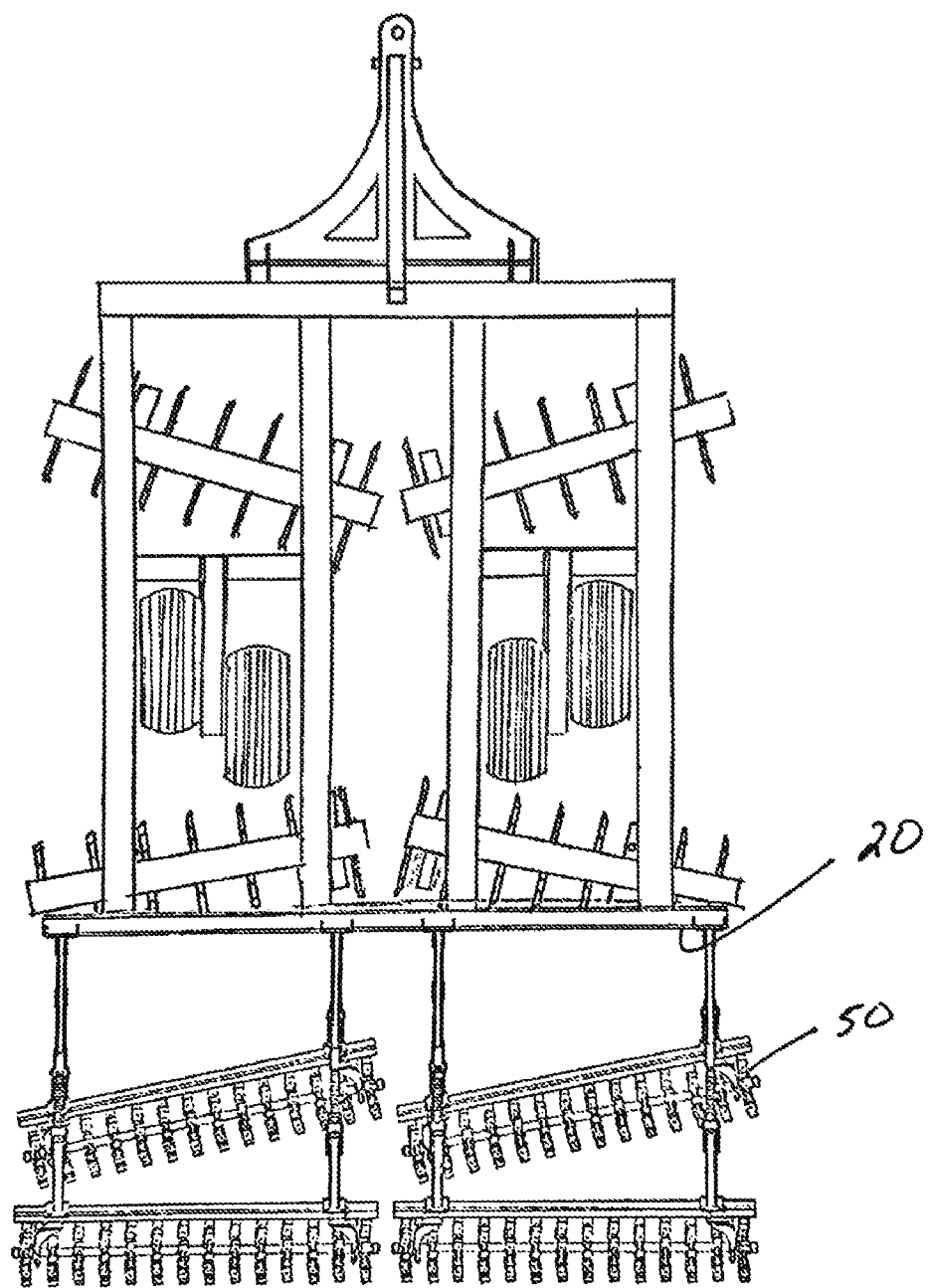
FIG. 1 is a top view showing an embodiment of the present invention connected to a harness.
Figure 1A:
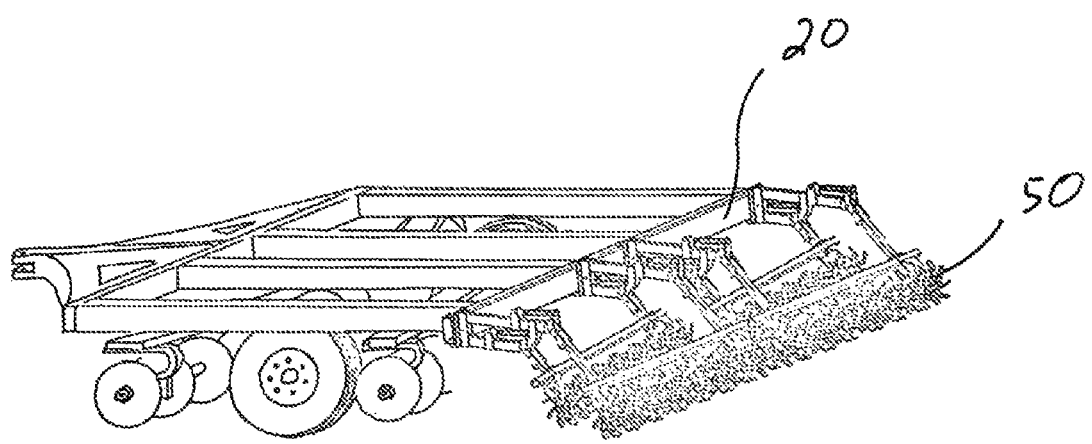
FIG. 1A is a perspective view of the embodiment illustrated in FIG. 1.
Figure 2:
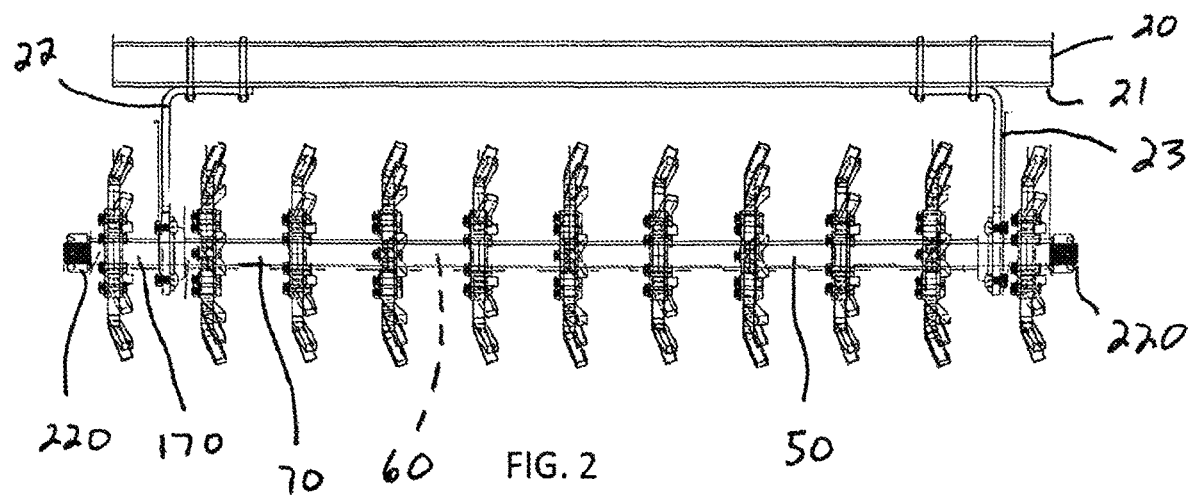
FIG. 2 is a side view of the harrow connected to a harness.
Figure 3:
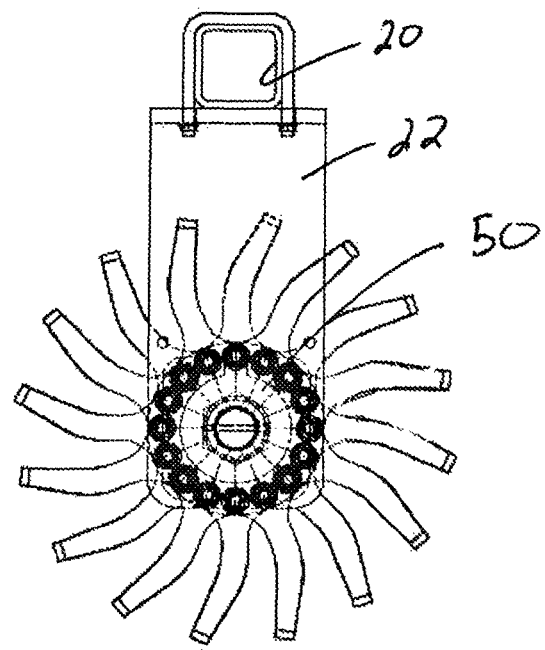
FIG. 3 is an end view of the harrow illustrated in FIG. 2.

Turning first to FIGS. 1-20, it is seen that a first preferred embodiment of a harrow 50 present invention is illustrated. The invention can be pulled behind a machine with an assembly with a harness 20 as seen in FIGS. 1 and 1A. The harness 20 can have a lateral 21 and two risers 22 and 23, respectively, as seen in FIG. 2. While an exemplary harness 20 is illustrated, it is appreciated that alternative harnesses could be used without departing from the broad aspects of the present invention. The harrow 50 is described below.

The harrow 50 has a shaft 60 that can support spindles (any number and combination of spindles 70 and end spindles 170). Attachments are supported by the spindles.

Figure 4:
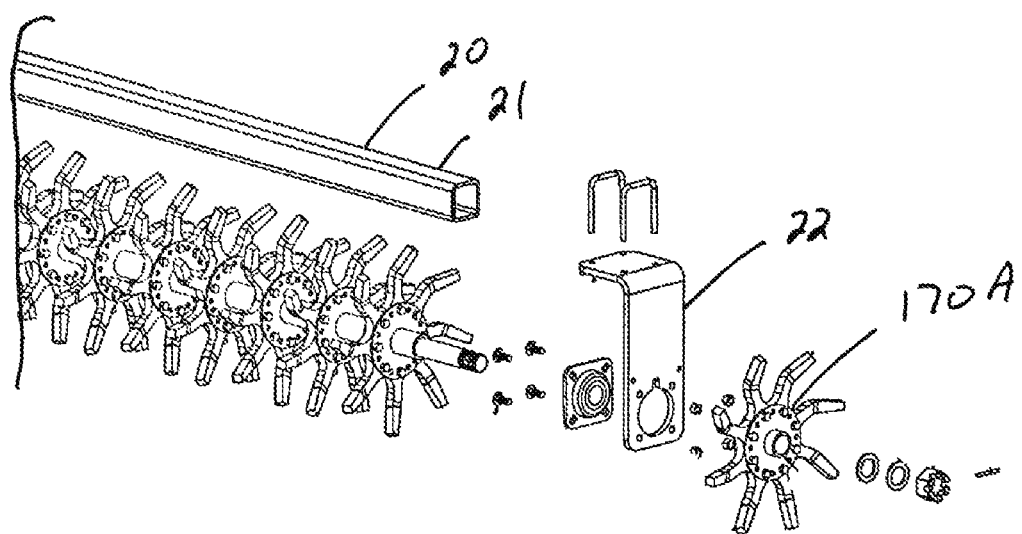
FIG. 4 is an exploded view of a portion of the harrow illustrated in FIG. 2.
Figure 5:
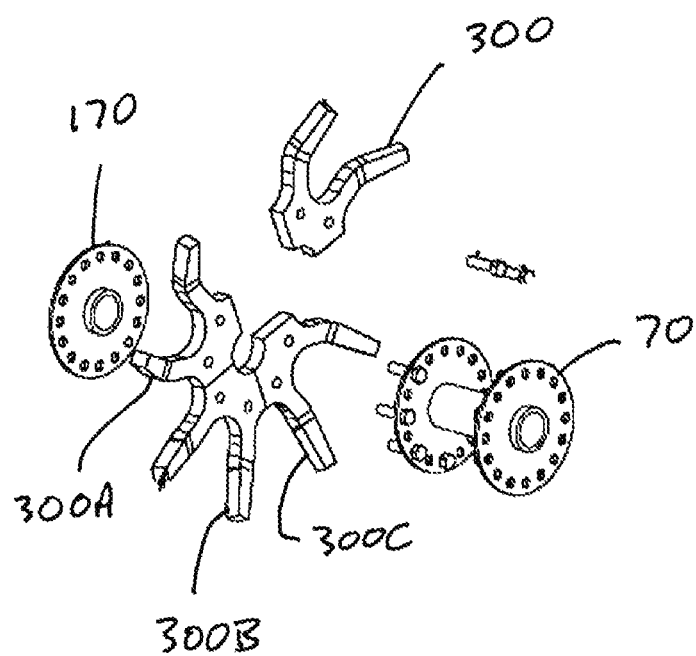
FIG. 5 is a partially exploded view of attachments between two spindles.
Figure 6:
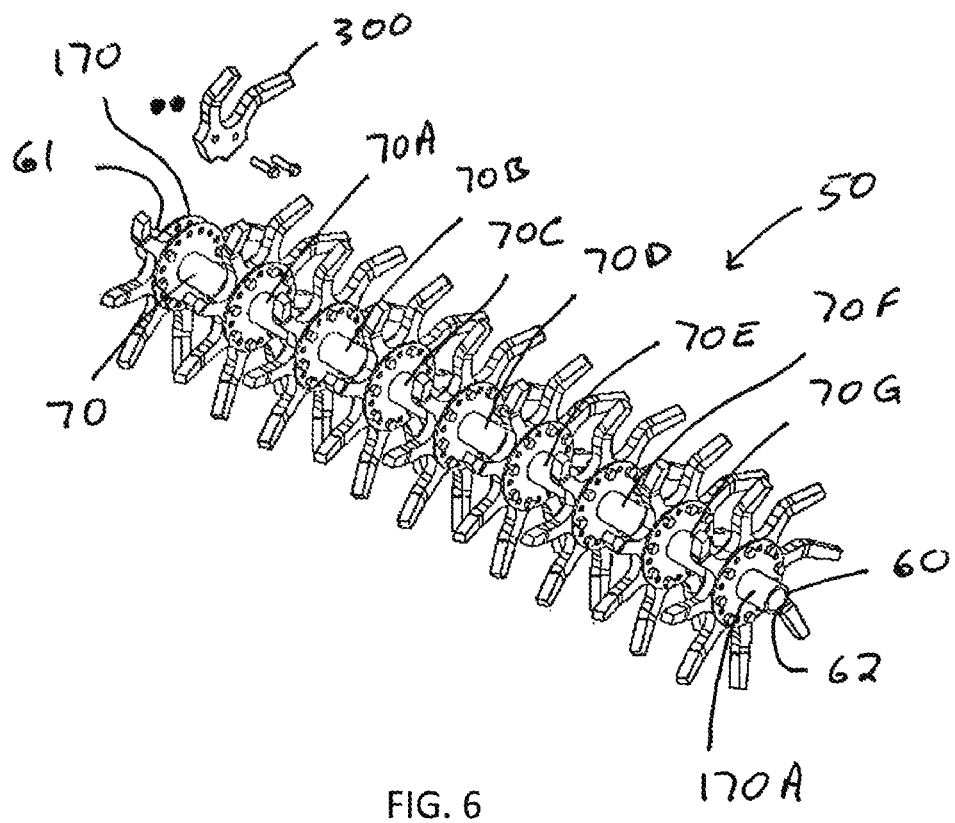
FIG. 6 is a partially exploded perspective view of a preferred embodiment of the present invention.
Figure 9:
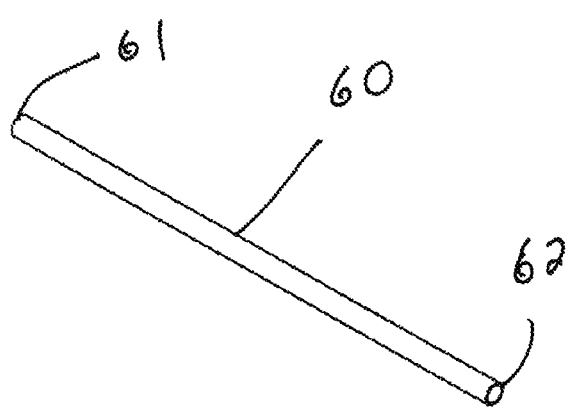
FIG. 9 is a perspective view of a shaft.

The shaft 60 is preferably a circular shaft having a given length. A preferred length can be between 42 and 85 inches. However, it is understood that the length can be longer or shorter without departing from the broad aspects of the present invention. The shaft is preferably a solid shaft having a high degree of strength. The shaft has a shaft axis. A preferred embodiment of the shaft 60 is illustrated in FIG. 9. The shaft, as seen in FIG. 4, can have threaded ends.

Figure 13:
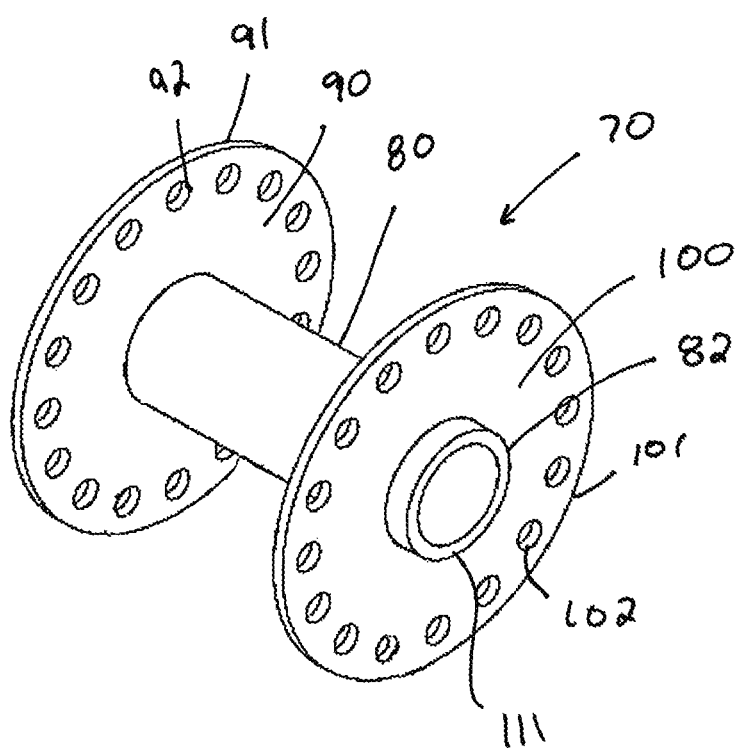
FIG. 13 is a perspective view of a spindle.
Figure 17:
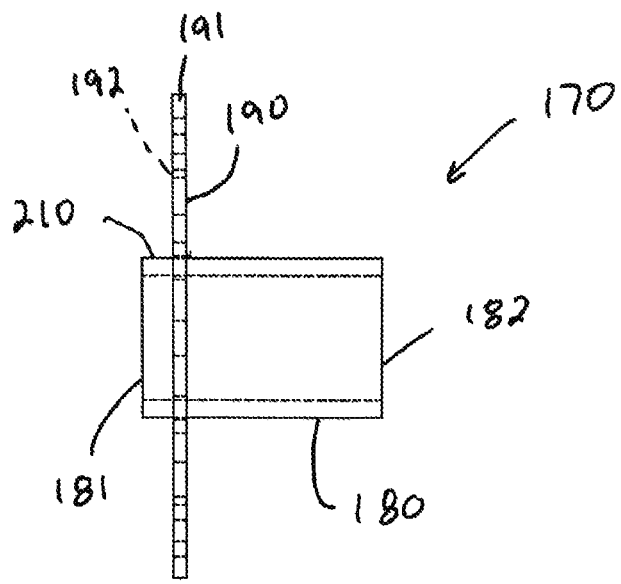
FIG. 17 is a side view of the end spindle illustrated in FIG. 16.
Figure 18:
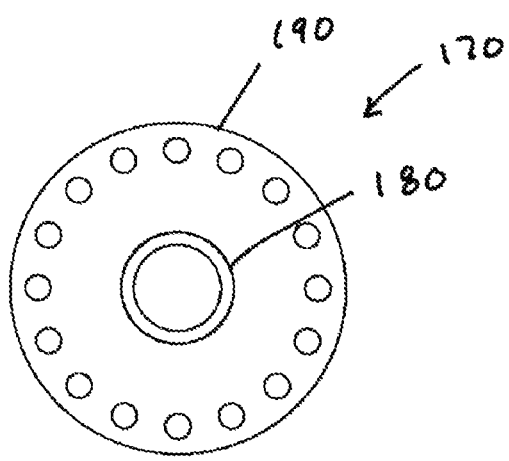
FIG. 18 is an end view of the end spindle illustrated in FIG. 16.
Figure 19:
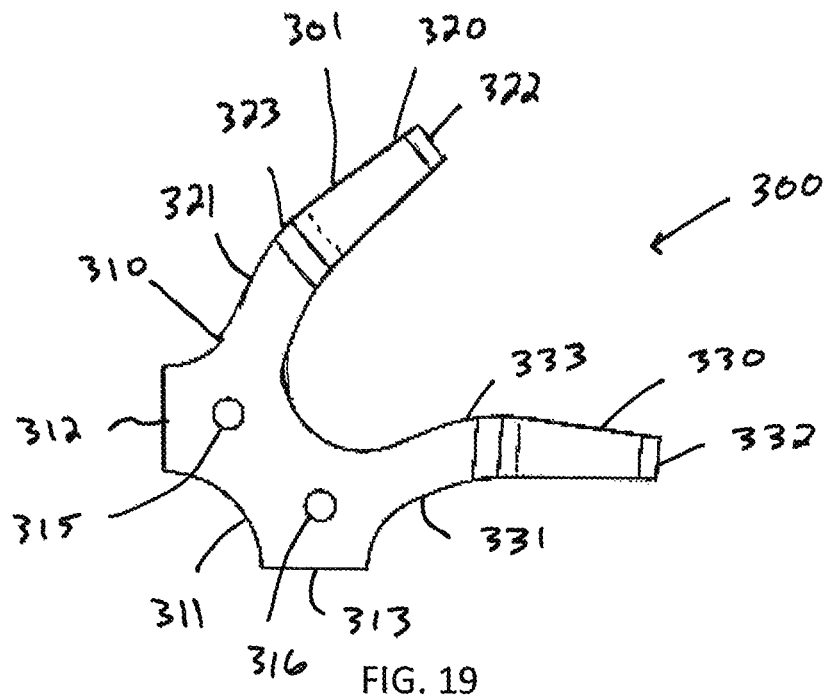
FIG. 19 is a side view of a preferred embodiment of an attachment.
Figure 20:
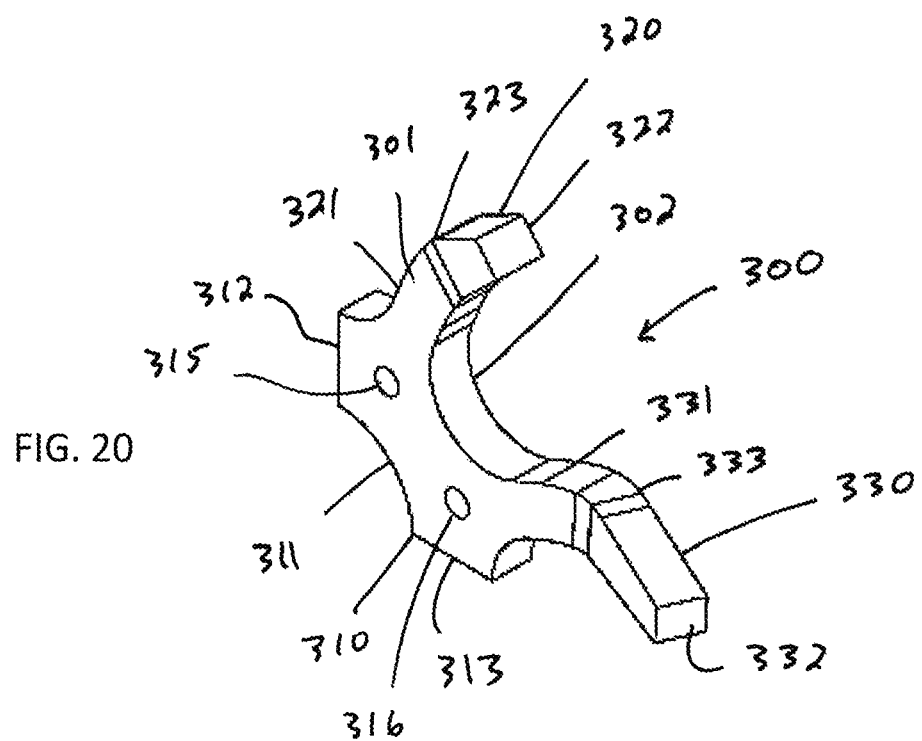
FIG. 20 is a perspective view of the attachment illustrated in FIG. 19.
Figure 27:
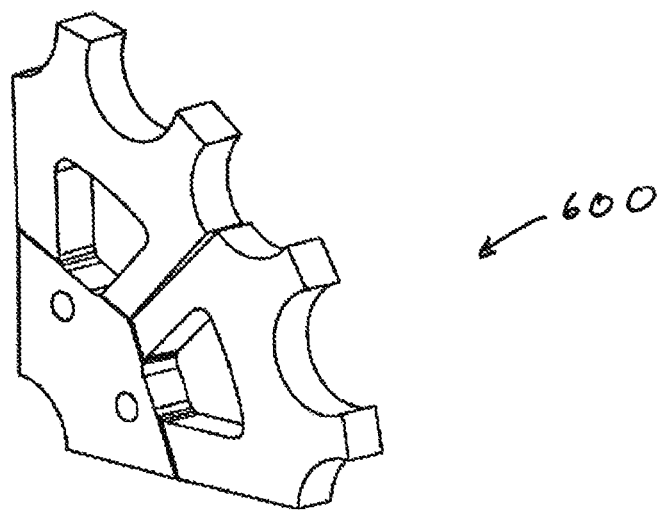
FIG. 27 is a perspective view of an alternative embodiment of an attachment.
Figure 28:
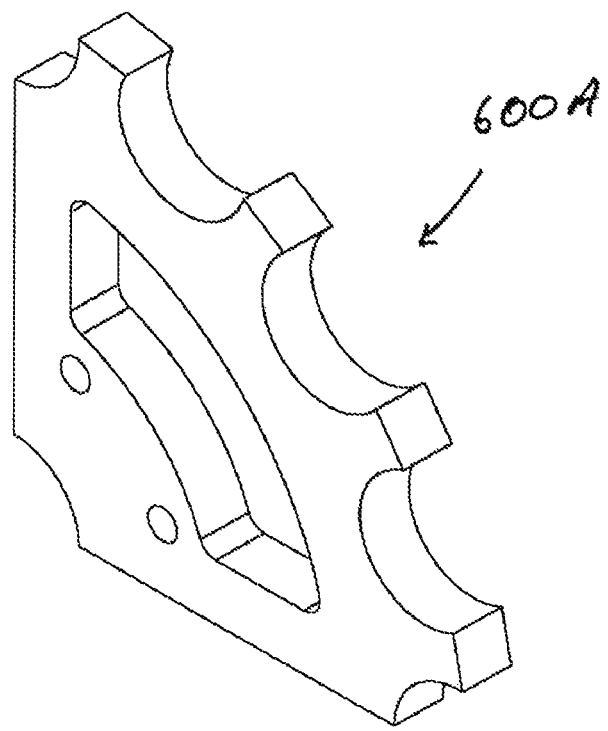
FIG. 28 is a perspective view of an alternative embodiment of an attachment.
Figure 29:
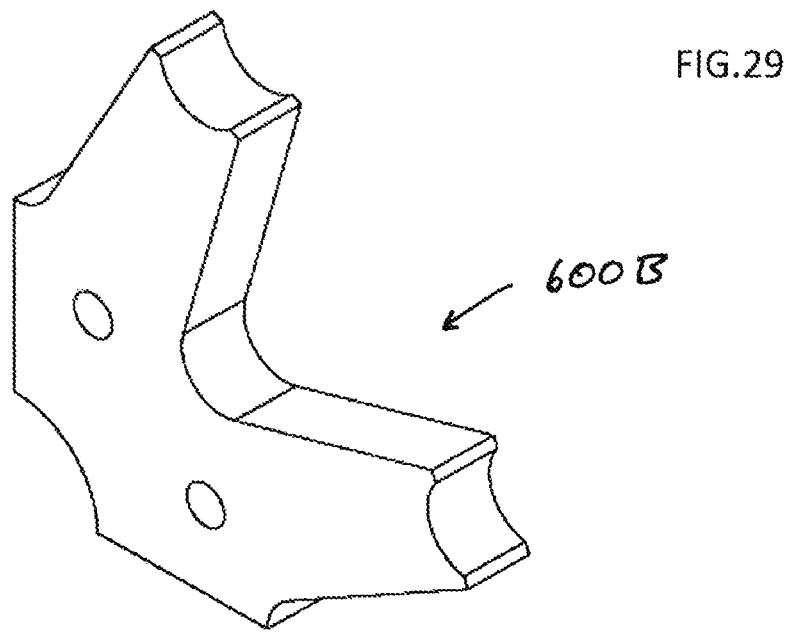
FIG. 29 is a perspective view of an alternative embodiment of an attachment.
Figure 30:
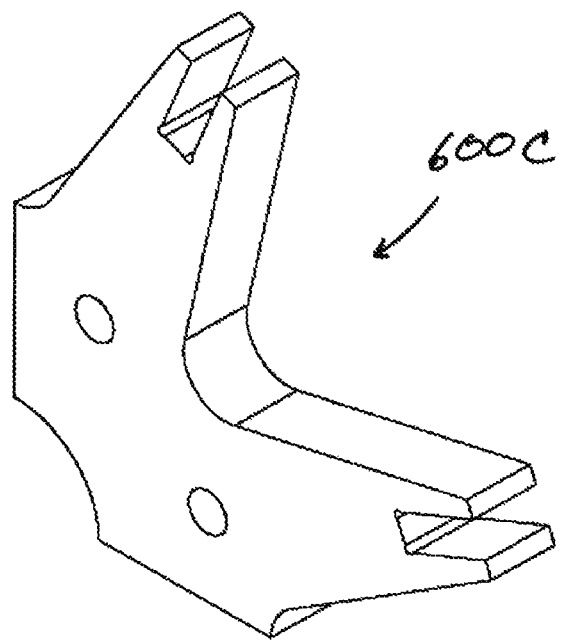
FIG. 30 is a perspective view of an alternative embodiment of an attachment.

At least one spindle 70 is provided, and is seen in isolation in FIGS. 13-15. Spindle 70 has a tube 80 with opposed ends 81 and 82. The tube 80 has a tube longitudinal axis. A flange 90 extends radially from the tube 80 near end 81. The flange 90 has a circular perimeter 91. There are preferably sixteen holes 92 that are equally spaced about the perimeter 91 of the flange 90. A flange 100 extends radially from the tube 80 near end 82. The flange 100 has a circular perimeter 101. There are preferably sixteen holes 102 that are equally spaced about the perimeter 101 of the flange 100. A lip 110 longitudinally extends beyond flange 90 (the lip 110 is the end portion of the tube). A lip 111 ends beyond flange 100 (the lip 111 is the end potion of the tube 80). Lips 110 and 111 are at opposite ends of the spindle 70. The spindle is preferably symmetrical about a geometric center plane, both longitudinally and radially.

The spindle 70 can be slid onto the shaft 60. In this regard, the interior of the tube 80 is slightly larger than the exterior of the shaft 61.

Figure 10:
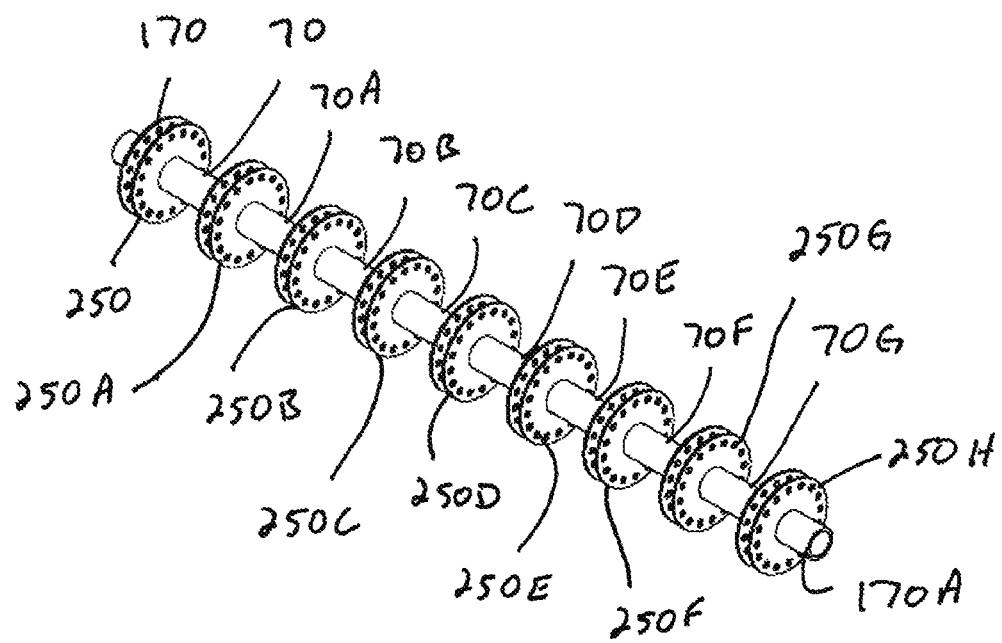
FIG. 10 is a perspective view of spindles shown in end to end orientations.
Figure 11:
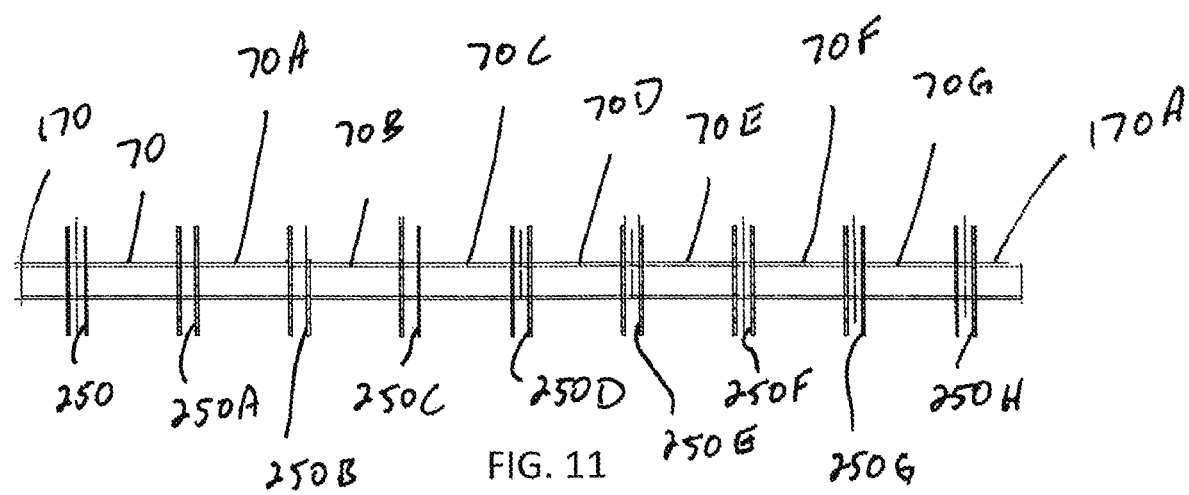
FIG. 11 is a side view of the view illustrated in FIG. 10.
Figure 12:
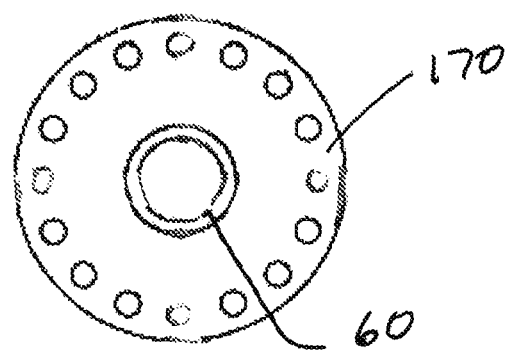
FIG. 12 is an end view of the view illustrated in FIG. 10.

There are preferably eight spindles (70, 70A, 70B, 70C, 70D, 70E, 70F and 70G) provided in the preferred embodiment. Yet, it is appreciated that there could be more or less spindles provided without departing from the broad aspects of the present invention. Each spindle is preferably identical to the other spindles. The spindles can be inserted longitudinally end to end upon the shaft 60, as seen in FIGS. 10-12.

Spindles can be made in several sizes, including but not being limited to, 6, 7 and 8 inches.

An end spindle 170 is provided. The end spindle 170 is illustrated in isolation in FIGS. 16-18. Spindle 170 has a tube 180 with opposed ends 181 and 182. The tube 180 has a tube longitudinal axis. A flange 190 extends radially from the tube 180 near end 181. The flange 190 has a circular perimeter 191. There are preferably sixteen holes 192 that are equally spaced about the perimeter 191 of the flange 190. A lip 210 longitudinally extends beyond flange 190 (the lip 210 is the end portion of the tube). The spindle is preferably symmetrical about a geometric center plane aligned with the longitudinal axis. The end spindle 170 is a half spindle, having a length of one-half of spindle 70. In this regard, spindle 70 could be split into two spindles 170 if cut along its central plane.

The end spindle 170 can be slid onto end 61 of the shaft, wherein lip 210 can abut a lip of an adjacent spindle 70.

A second end spindle 170A is provided on the opposite end 62 of the shaft. The second end spindle 170 is identical to end spindle 170, but is inverted upon placement so that the lip abuts the lip of the adjacent spindle.

Looking back to FIGS. 10 and 11, it is seen that nine junctions (250, 250A, 250B, 250C, 250D, 250E, 250F, 250G and 250H) are formed by the abutting eight spindles and two end spindles. Each junction specifically is formed of two flanges and two lips (one flange and one lip from each of two abutting spindles). The flanges of each junction are parallel to each other and spaced apart by a distance of twice the length of a lip. Holes of all of the flanges can be rotationally aligned so that their respective center axis are aligned.

End caps 220 can be provided to longitudinally lock the spindles 70 and 170 on the shaft 60. The end caps can be threaded to mate with the threaded ends of the shaft 60.

An attachment 300 is provided. The attachment 300 has opposed sides 301 and 302. The attachment 300 has a base 310 with a neck 311 and two walls 312 and 313. Wall 312 lies in a wall plane. Wall 313 lies in a wall plane that is generally perpendicular to the wall plane of wall 312. The neck 311 spans between walls 312 and 313, has a surface similar to an interior radius of one quarter of a tube. Two holes 315 and 316 are between sides 301 and 302. Two spikes 320 and 330 are provided. Spike 320 has a proximal end 321 and a distal end 322. The spike 320 can have a bend 323 between the distal and proximal ends 321 and 322, respectively. Spike 330 has a proximal end 331 and a distal end 332. The spike 330 can have a bend 333 between the distal and proximal ends 331 and 332, respectively.

The attachment 300 can be supported at a junction 250. In this regard, the holes 315 and 316 can be aligned with two holes about a perimeter of two flanges. Four attachments (300, 300A, 300B and 300C) can be supported at each junction. In this regard, as the respective walls are perpendicular, and as the respective necks are semicircular, it is appreciated that four attachments are supported at each junction.

It is appreciated that the two attachment holes are aligned with two flange holes wherein one flange hole is between the two flange connecting holes on account of there being sixteen flange holes and eight attachment holes (from the four attachments).

It is also appreciated that each attachment could have three holes (instead of two holes) that are alignable with the spindle holes for increased strength. Such a design would not impair the option to stagger the attachments between junctions.

There are preferably four attachments at each of the nine junctions, resulting in 36 attachments and 72 spikes. Further, the attachments can be put to any desired rotational orientation relative to the attachments of the adjacent junction. This allows for rotational offset of spike between respective junctions, if desired.

It is further appreciated that it is the lips that provide with width dimension of the junctions. In this regard, one or even all of the attachments at a particular junction can be removed and replaced without interfering with the remainder of the harrow geometry.

Figure 7:
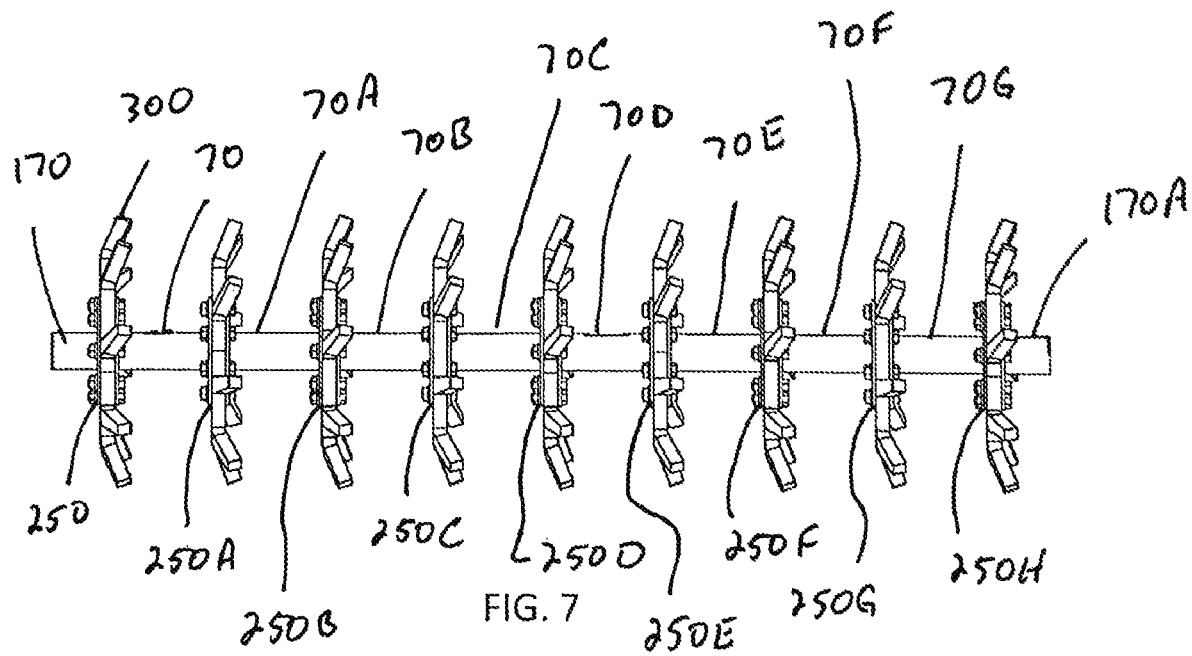
FIG. 7 is a side view of the embodiment illustrated in FIG. 6.
Figure 7A:
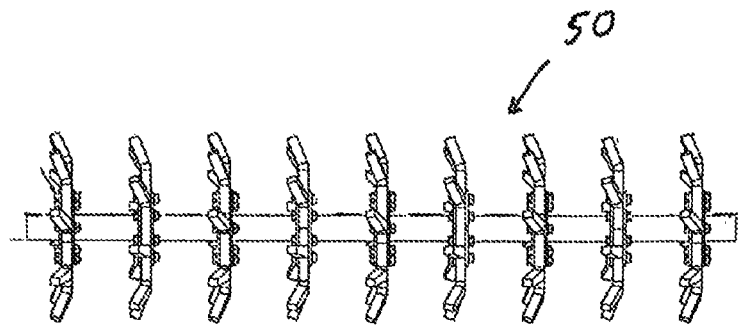
FIG. 7A is similar to FIG. 7, but shows an alternative attachment spike angle.
Figure 8:
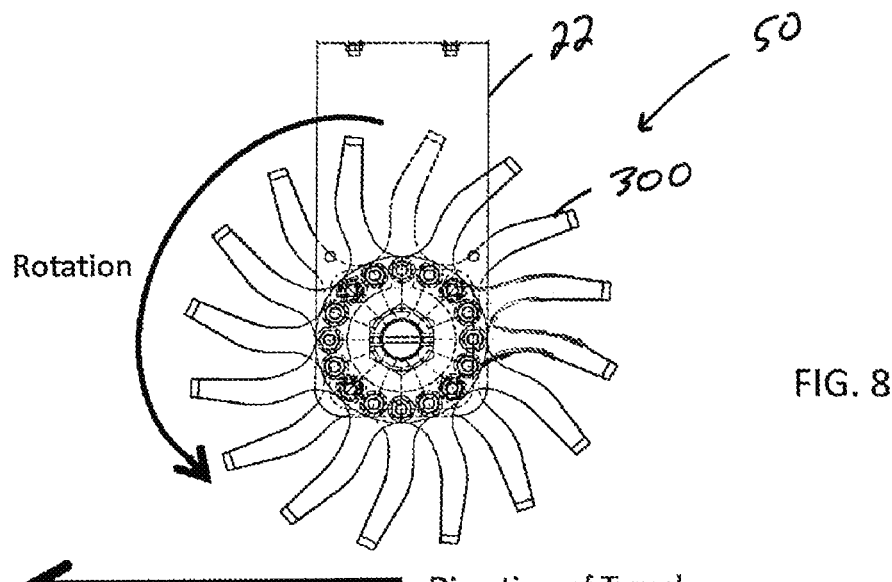
FIG. 8 is an end view of the embodiment illustrated in FIG. 6.

Turning briefly to FIG. 7A, it is seen how the orientation of the spike angles can be reversed.

Turning now to FIGS. 21-26, it is seen that a second preferred embodiment is illustrated. The harrow 350 has spindles 370 (preferably eight spindles) and half or end spindles 470 (preferably two end spindles). The spindles 370 and 470 are placed along a shaft end to end to form nine junctions. Each junction can support four attachments equally spaced radially about the junction.

Each attachment 500 has opposed sides 501 and 502. A base 510 is provided and supported by the junction. The attachment 500 further has a seat 520 supporting a paddle 521 and a second seat 530 supporting a paddle 531. The paddle 531 can be centered or can be either left or right justified in the seat 530. The paddles 531 are preferably welded in place in the seats 530.

The attachments of the illustrated embodiments are illustrative only. It is appreciated that there could be a wide variety of attachments used without departing from the broad aspects of the present invention.

Four alternative designs of attachments are shown in FIGS. 27-30, respectively. Looking specifically at FIG. 27, it is seen that a bracket is provided for holding two individual members to form a ¼ circular shaped attachment.

Figure 31:
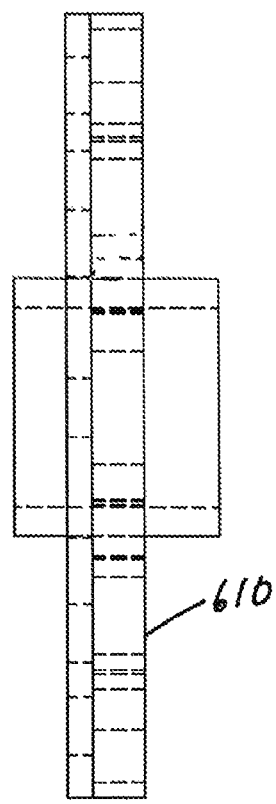
FIG. 31 is an end view of an embodiment of a bolt guard.
Figure 32:
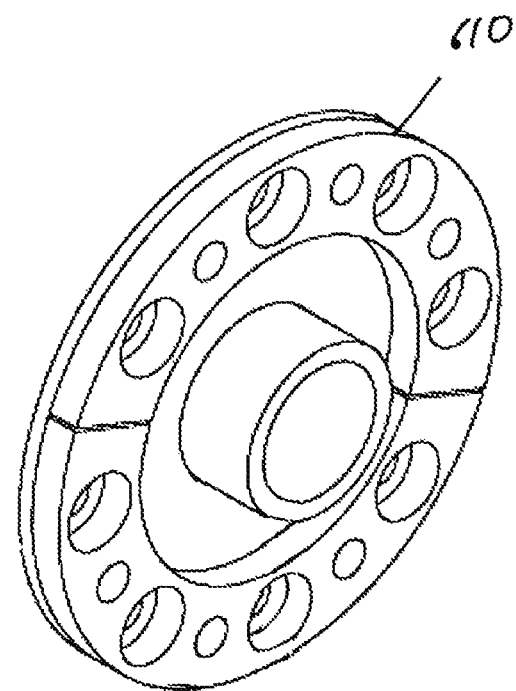
FIG. 32 is a perspective view of the embodiment illustrated in FIG. 31.
Figure 33:
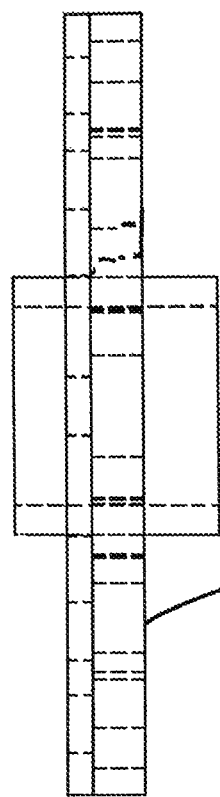
FIG. 33 is an end view of an embodiment of a nut holder.
Figure 34:
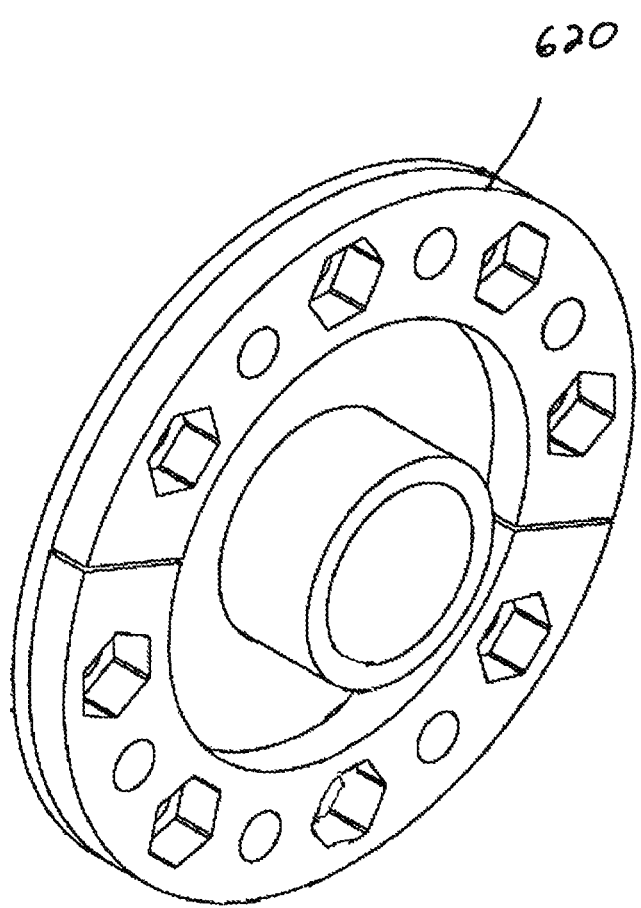
FIG. 34 is a perspective view of the embodiment illustrated in FIG. 32.
Figure 35:
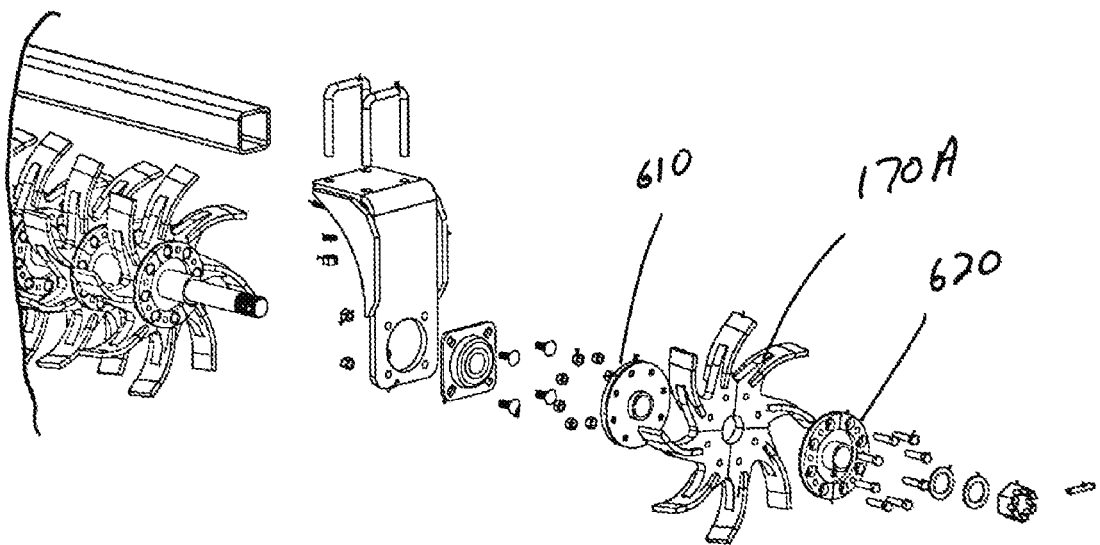
FIG. 35 is an exploded perspective view showing bolt guards and nut holders in place on spindles.

A bolt guard 610 is shown in FIGS. 31 and 32, and a nut holder 620 is shown in FIGS. 33 and 34. The nut guard is dimensioned so that nuts can be seated within pockets of the nut guard, wherein rotation of the nuts is prevented while seated within the respective pockets. An exploded assembly is shown in FIG. 35 wherein bolt guards 610 and nut holders 620 are shown in position on spindles.

Figure 36:
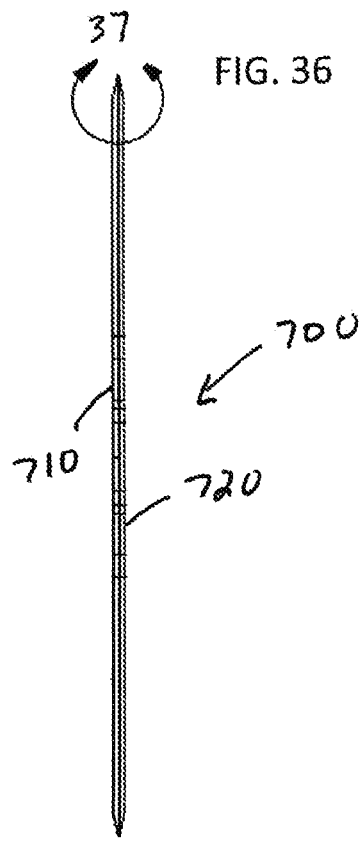
FIG. 36 is a side view of an alternative embodiment of an attachment.
Figure 37:
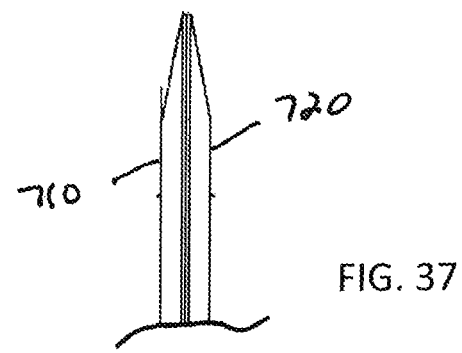
FIG. 37 is a close-up view of the radial end of the embodiment of an attachment illustrated in FIG. 36.
Figure 38:
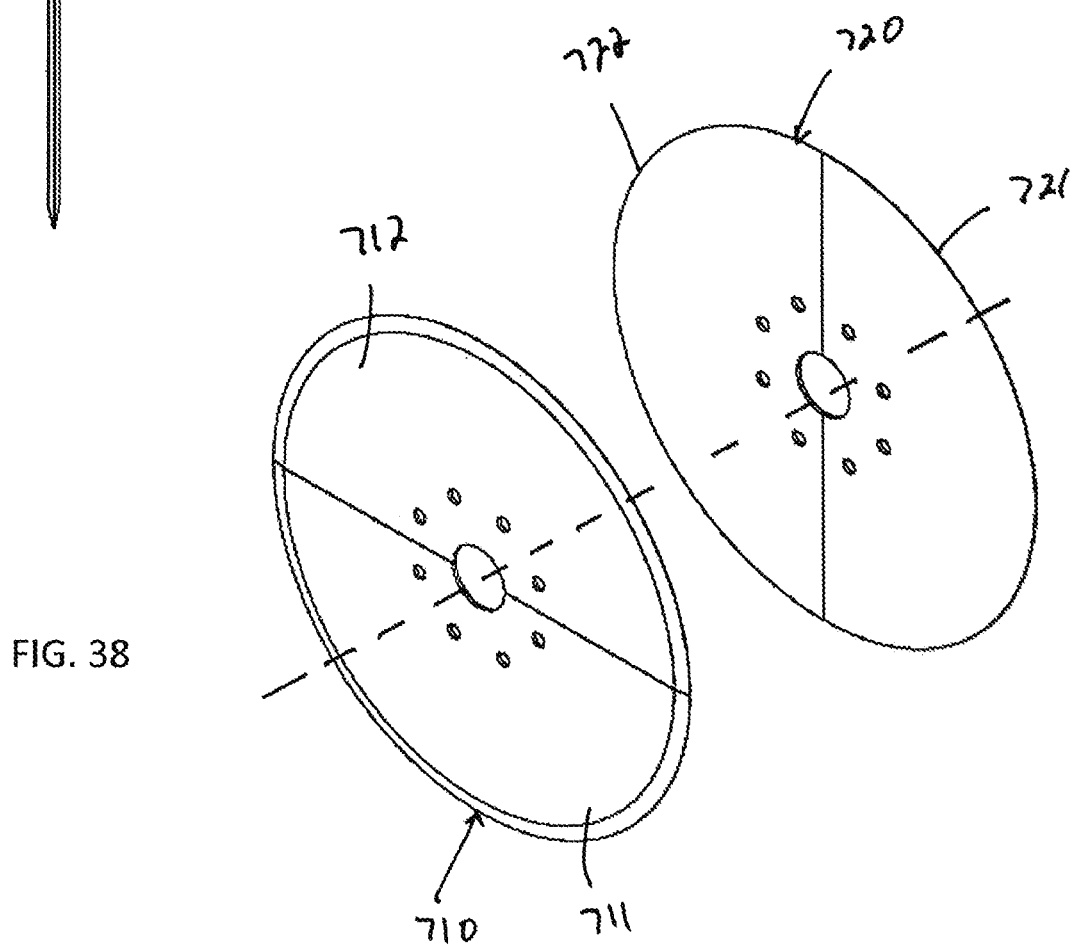
FIG. 38 is an exploded view of the embodiment of an attachment illustrated in FIG. 36.

Turning now to FIGS. 36-38, it is seen that another preferred embodiment of an attachment is illustrated. The attachment 700 can optionally have two sides 710 and 720, respectively. Side 710 has a first piece 711 and a second piece 712. Each of the pieces is preferably a semicircle (radial end measuring 180 degrees). In this regard, a side with a full 360 degrees is comprised on just two pieces. When a single side is used, either piece can be independently removed while the other remains in place.

For increased strength, second side 720 can also be provided. The second side has a first piece 721 and a second piece 722. Each of the pieces is preferably a semicircle (radial end measuring 180 degrees). In this regard, a side with a full 360 degrees is comprised on just two pieces. Sides 710 and 720 can be joined in a rotationally offset manner wherein rotational stability between the sides is provided by bolts or other fasteners.

Thus it is apparent that there has been provided, in accordance with the invention, rolling harrow that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A rolling harrow comprising:
   a first spindle with a first spindle flange;
   a second spindle with a second spindle flange, a gap between said first spindle flange and said second spindle flange being a junction; and
   an attachment located between and removably connected to said first spindle flange and said second spindle flange,
   wherein:
      said attachment is a first attachment and comprises:
         a neck;
         a first wall;
         a second wall, said second wall being oriented perpendicular to said first wall; and
         two holes;
      said rolling harrow further comprises a second attachment, a third attachment and a fourth attachment;
      said first attachment, said second attachment, said third attachment and said fourth attachment are removably connectable to said first spindle and to said second spindle at said junction; and
      when said first attachment, said second attachment, said third attachment and said fourth attachment are connected to said first spindle and to said second spindle at said junction, said first attachment abuts said fourth attachment and said second attachment, said second attachment abuts said first attachment and said third attachment, said third attachment abuts said second attachment and said fourth attachment and said fourth attachment abuts said third attachment and said first attachment.

2. The rolling harrow of claim 1, wherein said first spindle and said second spindle are mounted upon a shaft.

3. The rolling harrow of claim 2, wherein:
said first spindle has first spindle lip;
said second spindle has a second spindle lip; and
said first spindle lip abuts said second spindle lip to form said junction.

4. The rolling harrow of claim 1, wherein each of said first attachment, said second attachment, said third attachment and said fourth attachment are independently removable.

5. The rolling harrow of claim 1, wherein said first spindle flange has sixteen equally spaced holes therethrough.

6. The rolling harrow of claim 1, wherein said first spindle flange is a first spindle first flange and said first spindle further comprises a first spindle second flange.

7. A rolling harrow comprising:
a first spindle with a first spindle flange, said first spindle flange having a first spindle flange hole there through;
a second spindle with a second spindle flange, said second spindle flange having a second spindle flange hole there through, said first spindle flange and said second spindle flange forming a junction; and
an attachment connected to said first spindle flange hole and to said second spindle flange hole to support said attachment and to rotationally lock said first spindle relative to said second spindle.

8. The rolling harrow of claim 7, wherein said first spindle and said second spindle are mounted upon a shaft.

9. The rolling harrow of claim 8, wherein:
said first spindle flange has sixteen equally spaced holes therethrough;
said second spindle flange is a second spindle first flange, and said second spindle further comprises a second spindle second flange; and
said rolling harrow further comprises a third spindle.

10. The rolling harrow of claim 7, wherein:
said first spindle has first spindle lip;
said second spindle has a second spindle lip; and
said first spindle lip abuts said second spindle lip to form said junction, wherein said attachment is removably connectable to said first spindle and to said second spindle at said junction.

11. The rolling harrow of claim 10, wherein:
said junction has a round profile; and
said attachment has a neck that has a round profile, and also has a first wall and a second wall, said first wall being perpendicular to said second wall.

12. The rolling harrow of claim 11, wherein:
said attachment is a first attachment;
said rolling harrow further comprises a second attachment, a third attachment and a fourth attachment;
said first attachment, said second attachment, said third attachment and said fourth attachment are removably connectable to said first spindle and to said second spindle at said junction;
when said first attachment, said second attachment, said third attachment and said fourth attachment are connected to said first spindle and to said second spindle at said junction, said first attachment abuts said fourth attachment and said second attachment, said second attachment abuts said first attachment and said third attachment, said third attachment abuts said second attachment and said fourth attachment and said fourth attachment abuts said third attachment and said first attachment.

13. A rolling harrow comprising:
a first spindle with a first spindle flange and a first spindle lip protruding beyond said first spindle flange;
a second spindle with a second spindle flange and a second spindle lip protruding beyond said second spindle flange,
wherein:
said first spindle lip abuts said second spindle lip at a junction, whereby said first spindle flange is spaced from said second spindle flange an amount, an attachment being supported at said junction by being connected to both of said first spindle flange and said second spindle flange.

14. The rolling harrow of claim 13, wherein:
said junction has a round profile; and
said attachment has a neck that has a round profile, and also has a first wall and a second wall, said first wall being perpendicular to said second wall.

15. The rolling harrow of claim 14, wherein:
said attachment is a first attachment;
said rolling harrow further comprises a second attachment, a third attachment and a fourth attachment;
said first attachment, said second attachment, said third attachment and said fourth attachment are removably connectable to said first spindle and to said second spindle at said junction;
when said first attachment, said second attachment, said third attachment and said fourth attachment are connected to said first spindle and to said second spindle at said junction, said first attachment abuts said fourth attachment and said second attachment, said second attachment abuts said first attachment and said third attachment, said third attachment abuts said second attachment and said fourth attachment and said fourth attachment abuts said third attachment and said first attachment.

16. The rolling harrow of claim 13, wherein:
said first spindle flange has sixteen equally spaced holes therethrough;
said second spindle flange is a second spindle first flange, and said second spindle further comprises a second spindle second flange; and
said rolling harrow further comprises a third spindle.

17. The rolling harrow of claim 13, wherein said first spindle and said second spindle are mounted upon a shaft.

18. A rolling harrow comprising:
a first spindle with a first spindle flange;
a second spindle with a second spindle flange; and
a plurality of attachments located between and removably connected to said first spindle flange and said second spindle flange, each of said plurality of attachments having:
a neck;
a first wall;
a second wall, said second wall being separated from said first wall with said neck; and
two holes,
wherein said plurality of attachments abut at least one other of said plurality of attachments at both of said first wall and said second wall.

* * * * *